United States Patent

[11] 3,586,263

| [72] | Inventor | Peter R. Payne<br>12221 Parklawn Drive, Rockville, Md. 20852 |
|---|---|---|
| [21] | Appl. No. | 798,569 |
| [22] | Filed | Jan. 3, 1969 |
| [45] | Patented | June 22, 1971<br>Continuation-in-part of application Ser. No. 711,742, Mar. 8, 1968, now abandoned. |

[54] KINESTHETICALLY CONTROLLED HELICOPTER
10 Claims, 12 Drawing Figs.

[52] U.S. Cl. ................................................. 244/17.17, 244/4, 416/63
[51] Int. Cl. .................................................. B64c 25/10, B64c 27/50
[50] Field of Search ........................................ 244/4, 17.11, 17.17, 17.19,; 416/63, 132, 135, 142

[56] References Cited
UNITED STATES PATENTS

| 2,180,922 | 11/1939 | DeBothezat | 416/63 |
| 2,596,378 | 5/1952 | Dobbins | 416/63 X |
| 2,640,549 | 6/1953 | Isacco | 416/63 |
| 2,689,011 | 9/1954 | Zakhartchenko | 416/135 |
| 2,745,498 | 5/1956 | Nagler | 416/63 |
| 2,757,745 | 8/1956 | Verhage et al. | 416/135 UX |
| 2,058,678 | 10/1936 | Fry | 244/17.19 X |
| 2,847,173 | 8/1958 | McCarty, Jr. | 244/17.11 |
| 3,029,047 | 4/1962 | Jacobsen et al. | 244/17.11 |
| 3,103,327 | 9/1963 | Parry | 244/17.19 X |
| 3,112,088 | 11/1963 | Speechley | 244/17.19 X |
| 3,133,715 | 5/1964 | Grunfelder | 244/17.11 |
| 3,185,409 | 5/1965 | Jacobsen | 244/17.11 |

FOREIGN PATENTS

| 247,395 | 5/1912 | Germany | 416/135 |

Primary Examiner—Milton Buchler
Assistant Examiner—Paul E. Sauberer
Attorney—Sughrue, Rothwell, Mion, Zinn & MacPeak

ABSTRACT: A kinesthetically controlled helicopter has a lightweight platform for supporting a man and handlebars with controls. A single rotor restrained by a stiff hinge has foldable rotor blades which are driven by a motor with appropriate gearing. The rotor may be arranged above the platform or below the platform. The position of the blade will dictate the particular elements that are folded. A tail rotor on a tail boom is controlled from the handlebars as is the motor. A landing gear includes foldable legs. The helicopter may thus be foldable into a compact structure and is lightweight enough for manual portability.

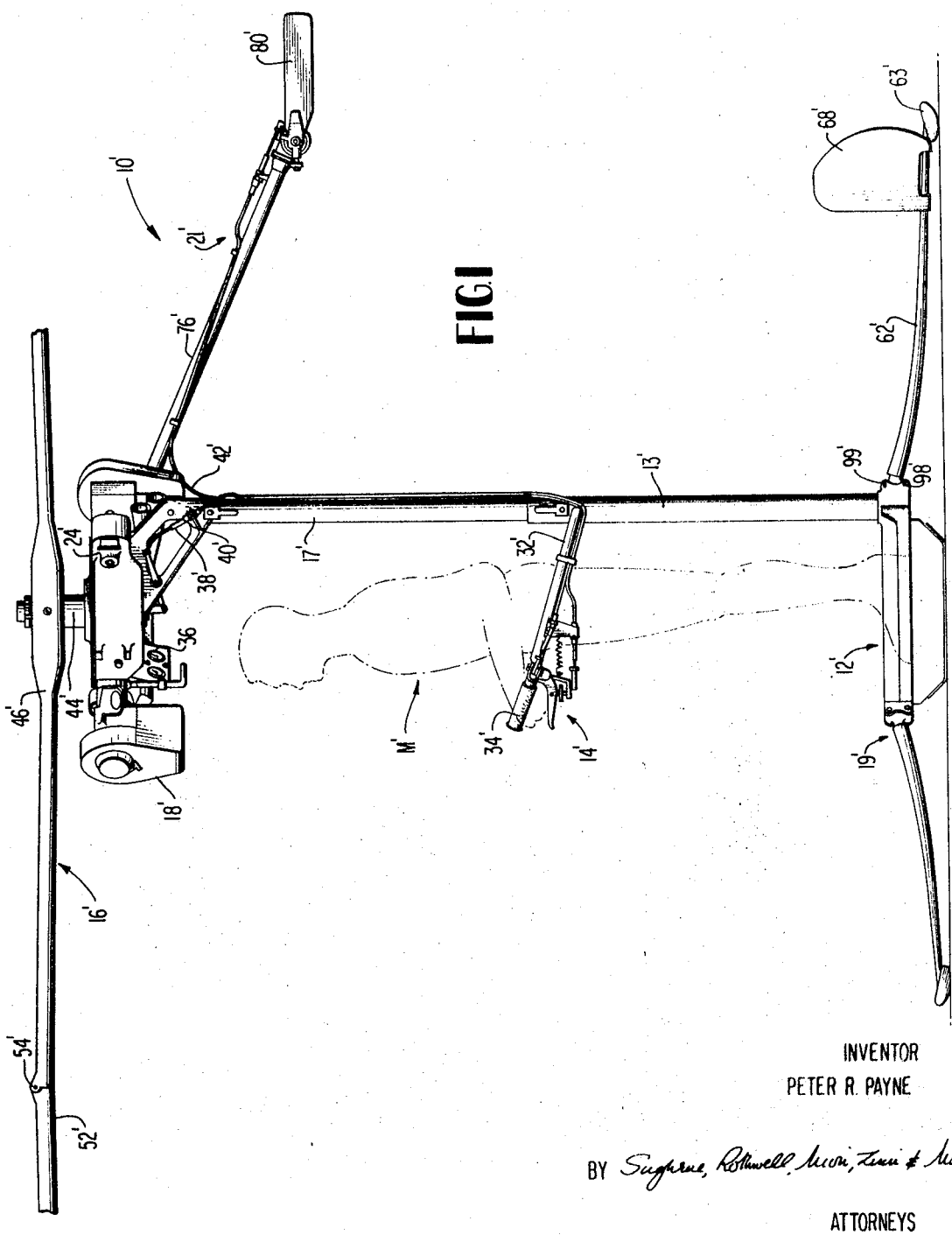

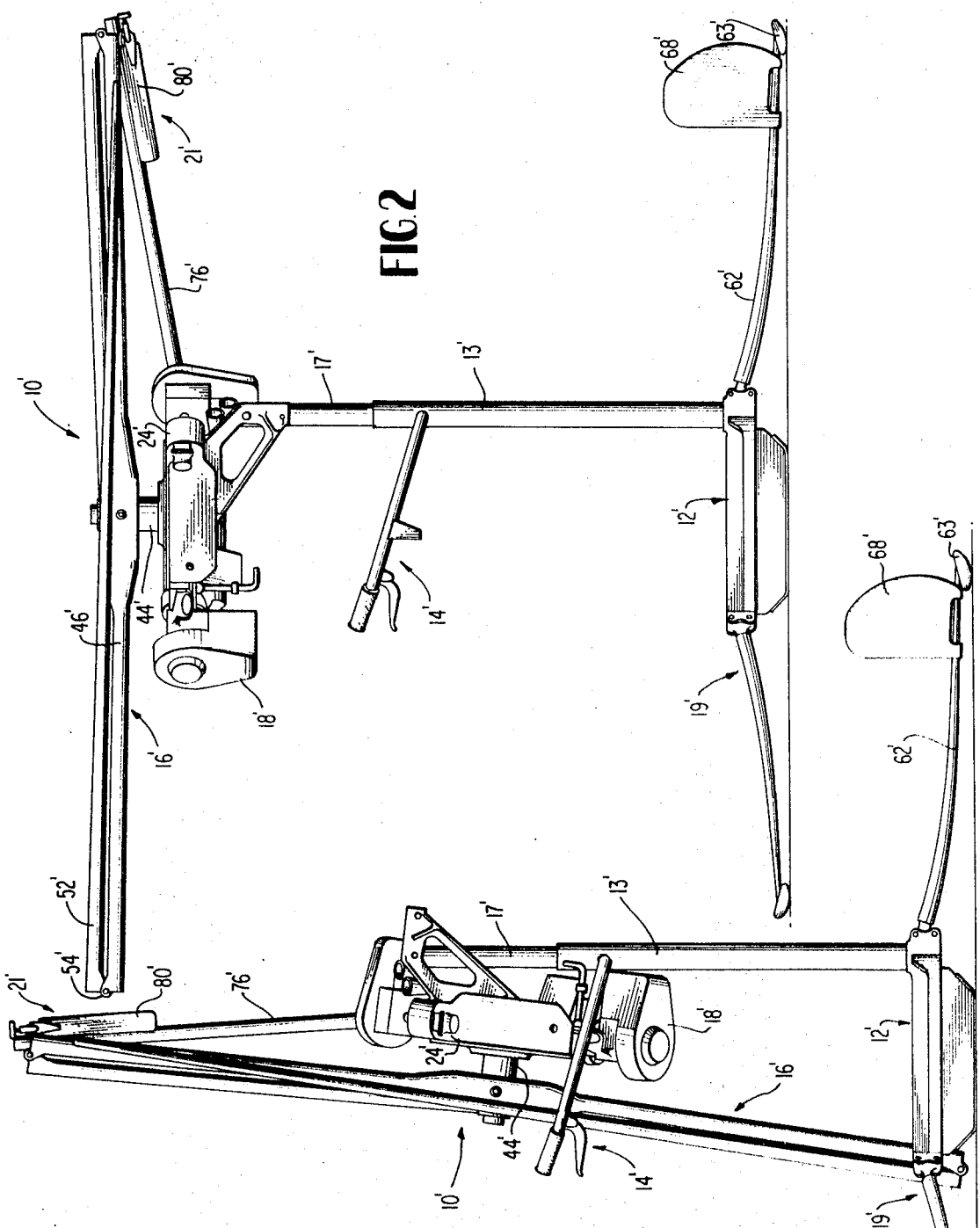

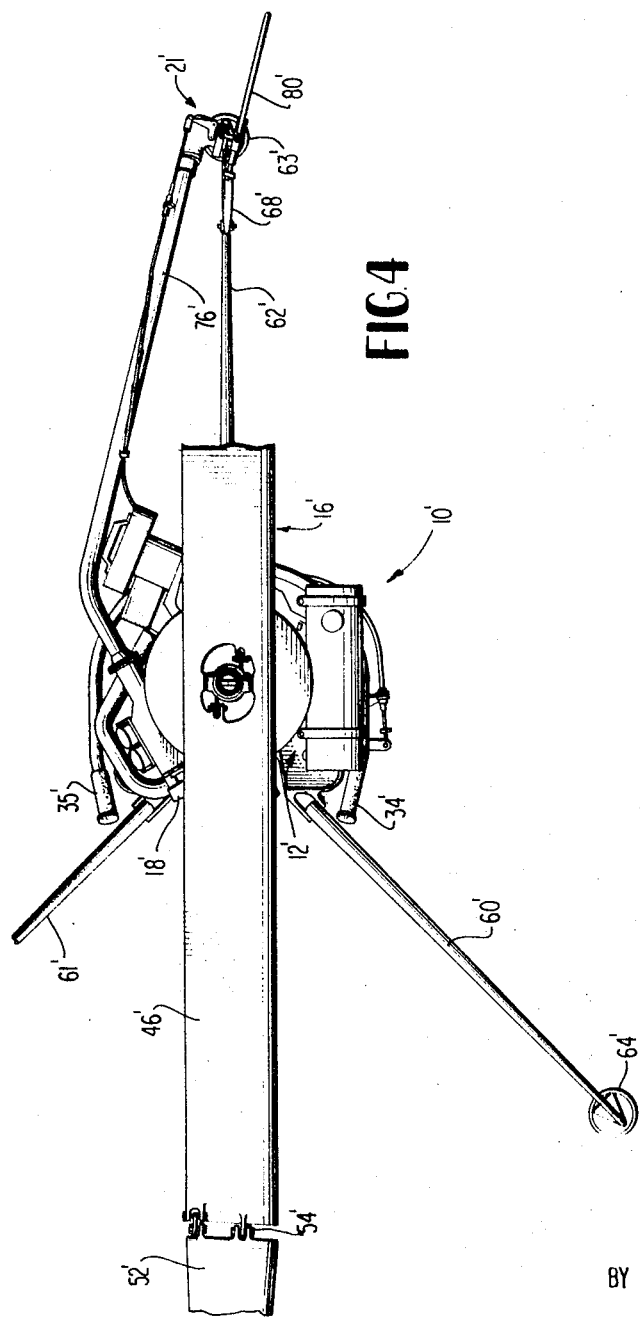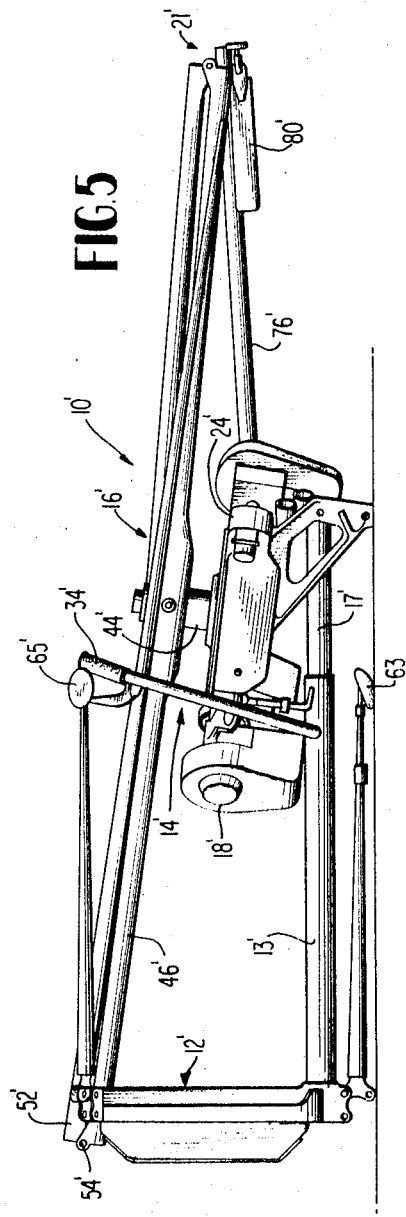
INVENTOR
PETER R PAYNE
ATTORNEYS

INVENTOR
PETER R. PAYNE

BY Saghrue, Rothwell, Mion, Zinn & Macpeak.
ATTORNEYS

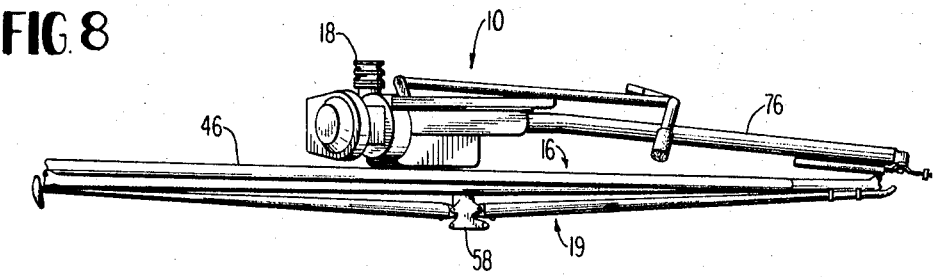
FIG. 8
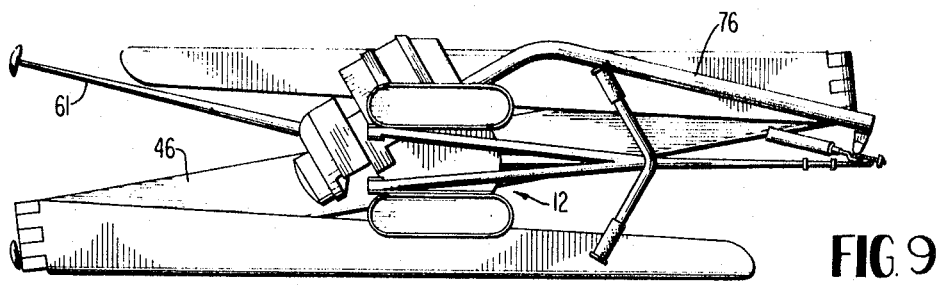
FIG. 9
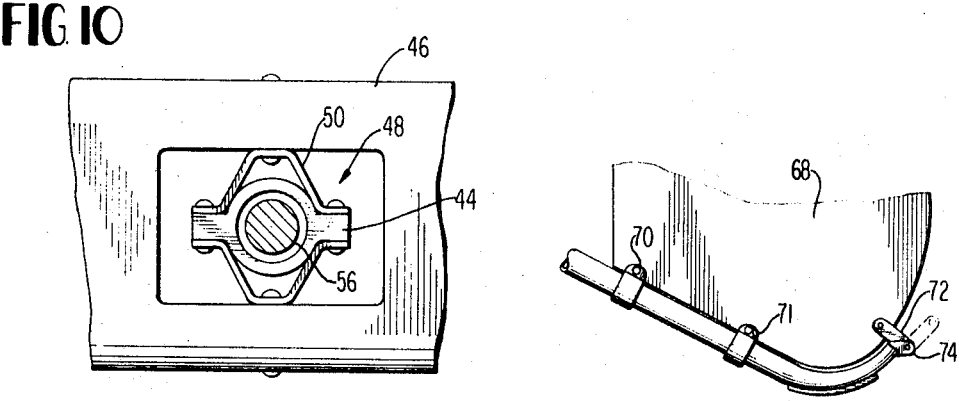
FIG. 10
FIG. 11
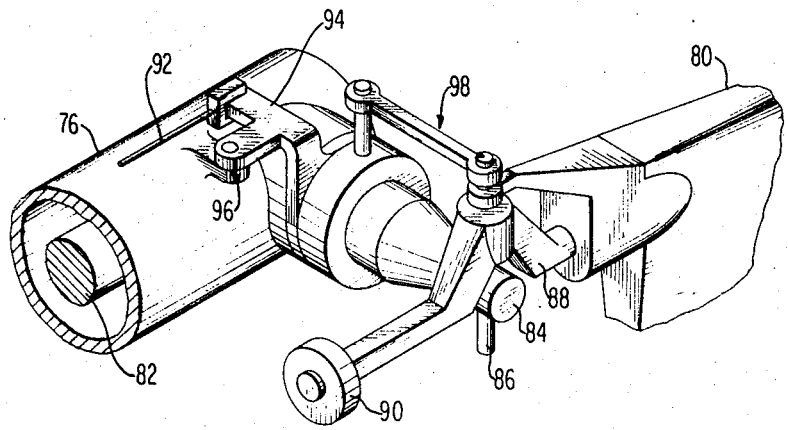
FIG. 12
INVENTOR
PETER R. PAYNE
BY Sughrue, Rothwell, Mion, Zinn & Macpeak
ATTORNEYS

KINESTHETICALLY CONTROLLED HELICOPTER

CROSS-REFERENCE TO RELATED APPLICATION

This application is a continuation-in-part of copending application Ser. No. 711,742, filed Mar. 8, 1968 now abandoned.

BACKGROUND OF THE INVENTION

1. Field of the Invention

This invention relates to improvements in kinesthetically controlled helicopters.

2. Prior Art

The concept of kinesthetic control and its application to flying machines was first proposed by Dr. Charles H. Zimmerman over 20 years ago. However, it was not in the mainstream of technological development and, therefore, the implementation of the kinesthetic control concepts into a practical and useful and easily controllable flying machine has still not yet been accomplished.

The basic principle of kinesthetic control is extremely simple If a man is capable of standing upright on his two feet, he is capable of stabilizing a flying platform so long as the mass of the platform is not large in comparison with that of the man and no large destabilizing forces are developed by the platform. In practice, it has been found that less muscular effort is required to stand upright and control a flying platform than is required to stand on solid earth.

Various attempts at implementing the kinesthetic control concepts have been built, none of which were entirely successful. These prior kinesthetically controlled flying machines include an arrangement known as "flying shoes" in which two small ducted fans driven by lightweight engines were attached to the feet of a pilot. Further developments included application of the concept of kinesthetic control to enable astronauts to maneuver in space by a small rocket which applied thrust directly to the soles of the feet. This arrangement was free from any secondary forces, such as rate damping which would be associated with a helicopter rotor.

Another attempt at a kinesthetically controlled flying machine principally due to Paul R. Hill, was that of a kinesthetically flown helicopter rotor powered by compressed air from ground based reservoir. Because of the power supply, the ability to maneuver was limited by the length of the hoses and thus true free flight was not possible. This arrangement had a handlebar which was fitted to it which aided in the controllability because the freely teetering rotor was rather difficult to control. It was also shown that stability was substantially improved by reducing the moment of inertia of the machine by the use of a flexible connection between the rotor platform and ancillary structure. A stiff hinge system was also used and this improved the stability and controllability.

Additional research developed a kinesthetically controlled coaxial helicopter (due to L. C. McCarty) and a ducted fan flying platform. The coaxial helicopter was more successful than the ducted fan flying platform, although even the coaxial helicopter was quite heavy because of the complex coaxial rotor system and it suffered from excessive static stability with respect to speed so it could not be flown at speeds in excess of 30 knots. This dual rotor helicopter known as the "helivector" (see McCarty U.S. Pat. No. 3,065,799) appears to be the most successful of free flying kinesthetically controlled machines. It was still unacceptable, however, due to excessive weight, lack of reliability and low maximum speed.

SUMMARY OF THE INVENTION

The present invention provides a kinesthetically controlled helicopter built to a minimum weight which provides advantages not only in being portable but also in improved controllability. A single teetering or flapping rotor is used. The single rotor avoids complexity of the dual rotating rotor, but requires a tail rotor, which in turn is easily controllable. The invention is extremely simple from a mechanical standpoint utilizing a lightweight engine, a simple gearbox, the housing of which may form a portion of the platform. The helicopter requires only a low powered engine and enhanced autorotation safety is obtained by using very low rotor disc loading.

BRIEF DESCRIPTION OF THE DRAWINGS

The best mode contemplated of carrying the invention will be described in detail below in connection with the accompanying drawings in which:

FIG. 1 is a side elevation view of the kinesthetically controlled helicopter of this invention with a portion of the rotor blades removed;

FIG. 2 is a side elevation view of the helicopter of this invention with the tail rotor in folded condition;

FIG. 3 is a side elevation view of the helicopter of this invention with the tail rotor and blades in folded condition;

FIG. 4 is a top plan view of the helicopter of this invention of FIG. 1;

FIG. 5 is a side elevation view of the helicopter of this invention in a completely folded condition;

FIG. 8 is a side elevation view of the helicopter of this invention in folded condition;

FIG. 9 is a top plan view of the helicopter of this invention in folded condition;

FIG. 10 is a sectional view taken along line 5—5 of FIG. 6;

FIG. 11 is a detail view of the vertical fin attaching arrangement; and

FIG. 12 is a detail perspective view of the tail rotor and control therefor.

DESCRIPTION OF THE PREFERRED EMBODIMENT

Figure 6:
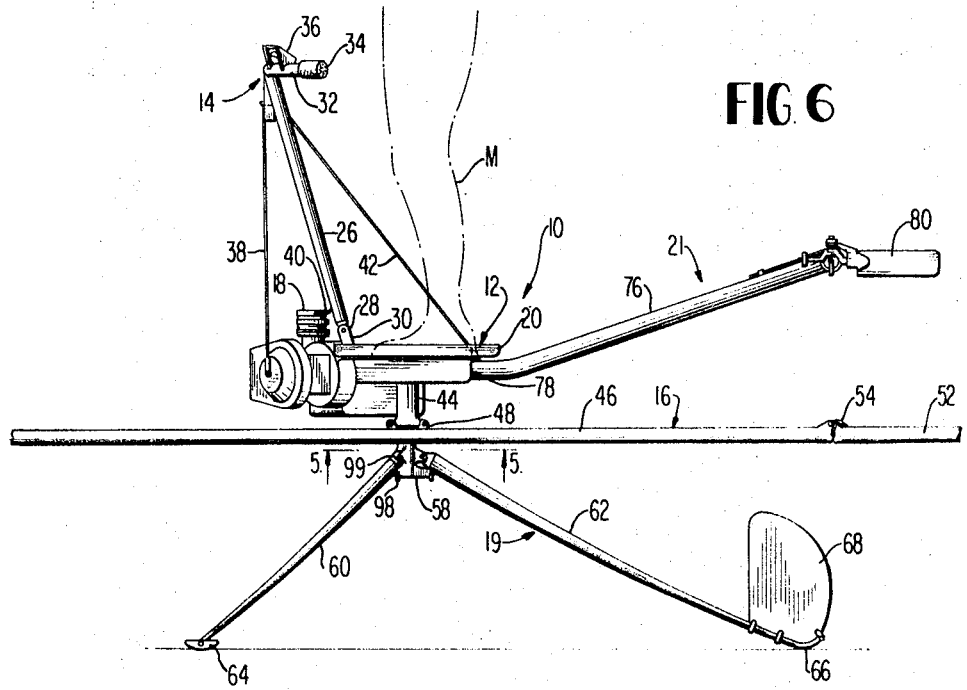
FIG. 6 is a side elevation view of the kinesthetically controlled helicopter of this invention with the rotor blades removed.

A kinesthetically controlled helicopter 10' is shown in its operative flying position in FIG. 1 at the time of takeoff or landing. The helicopter includes a platform assembly 12' for supporting a pilot M'. The handle assembly 14' extends upwardly and outwardly from the column support 13' for easy grasp by the standing man M'. A rotor assembly 16' is rotatably mounted above the pilot M' and is driven from a lightweight motor 18'. The tail rotor assembly 21' is cantilevered from the rotor head beneath the main rotor.

The platform 12' supports the pilot M' and the landing gear assembly 19'.

The handle assembly 14' can be a closed or open ring frame around the operator at hand level, as illustrated in FIG. 1 an open ring frame consisting of handlebars 32' is rigidly connected to the support column 13' and includes handle grip controls 34' and 35'. The handle grip controls may control lines such as 38' and 40', to the motor and throttle. A further control wire 42' may be utilized to control the tail rotor. Suitable instruments 36' for measuring operating conditions such as a dual tachometer, may be mounted above the pilot M' on the gear case 24'.

The rotor assembly 16' is driven from a drive shaft 44' which is connected to a rigid central blade section 46' by means of a stiff hinge 48'. The stiff hinge may include a spring drive connection 50 as mentioned later and seen in FIG. 10. Attached to the outer ends of the rigid blades 46' are outer sections 52' and another section not shown, which are hingedly connected thereto by hinges 54' extending at an angle to the axis of the blade so that the outer tip of the blade does not fold over the inner side of the blade. Preferably a linkage (not shown) permits the pilot to control the pitch angle of the main rotor blades in a manner known, and similarly to change the pitch of the rotor blades so that the pitch may be reduced for autorotational descent, (engine out) and to permit the pilot to vary the main rotor thrust rapidly for other maneuvers.

Landing gear assembly 19' is pivotally attached to the platform assembly 12' which includes a tripod landing gear of legs 60', 61' and 62'. Pads 63', 64' and 65' may be located at the end of the tripod legs. Landing gear leg 62' mounts a vertical fin 68'. The legs are lightweight, tubular tapered members and contribute stability to the helicopter in a ground position. The vertical fin 68' may be secured to the leg 62' in a manner similar to that illustrated in FIG. 11 and to be described later.

The motor assembly 18' is operatively connected to the gear case assembly 24' which in turn is pivotally connected to the telescoping column 17'. The tail rotor assembly 21' includes a tail boom 76' which is rotatable about its axis within a socket 78' in the gear assembly housing so that the tail boom itself may be folded as shown in FIG. 2. A tail rotor 80' is driver from the motor 18' in a manner to be described subsequently with respect to FIG. 12.

In operation, a man or pilot standing on the platform assembly 12' may start the motor rotating the rotor 16' the tail rotor 80' and fly the helicopter with substantially no previous experience. The controls are entirely within the handlebar assembly 14'. On landing the helicopter it may be folded to a compact arrangement as shown in FIGS. 2, 3, and 5 for manual portability. The helicopter folds by pivoting the outer ends 52' of the rotor about hinge 54', the telescoping support column 17' is withdrawn within the support column 13' and the engine gear assembly and rotor is pivotally moved relative to the support column. Finally the connecting pins 98' are removed from their connection with the landing gear assembly 12' and the legs are allowed to pivot about points 99' so that the helicopter assumes a compact condition as shown in FIG. 5 for easy manual portability.

A modified embodiment of a kinesthetically controlled helicopter 10 is shown in its operative flying position in FIG. 6 at the time of takeoff or landing. The helicopter includes a platform assembly 12 for supporting a pilot M. A handle assembly 14 extends upwardly from the platform for easy grasp by the standing man M. A rotor assembly 16 is rotatably mounted beneath the platform 12 and is driven from a lightweight motor 18. A landing gear assembly 19 is beneath the rotor, and a tail rotor arrangement 21 extends rearwardly from the platform 12.

The platform 12 includes foot pads 20 and 22 for supporting the feet or shoes of the pilot or operator M. These foot pads are mounted on a gear case 24 which forms the base of the platform.

The handle assembly 14 includes a pivoted bifurcated column 26 which is pivoted about pivot points 28 to yolks 30 extending from the gear case 24. The pivot arrangement is set so that the handle bars may be locked in the upright position or pivoted downwardly. A handle bar 32 extends transversely across the top of the column 26 and includes handle grip controls 34 and 35. Suitable instruments 36 may be mounted on the handlebars and the handle grip controls may control lines, such as 38 and 40, to the motor and throttle. A further control wire 42 may be utilized to control the tail rotor.

The rotor assembly 16 is driven from a drive shaft 44 which is connected to a rigid central blade section 46 by means of a stiff hinge 48. The stiff hinge may include a spring drive connection 50. Attached to the outer ends of rigid blade 46 are outer sections 52 and another section not shown, which are hingedly connected thereto by hinges 54 extending at an angle to the axis of the blade so that the outer tip of the blade does not fold over the inner side of the blade, see FIG. 9. Preferably a linkage (not shown) permits the pilot to control the pitch angle of the main rotor blades in a manner known, and similarly to change the pitch of the rotor blades so that the pitch can be reduced for autorotational descent (engine out) and to permit the pilot to vary the main rotor thrust rapidly for other maneuvers.

Figure 7:
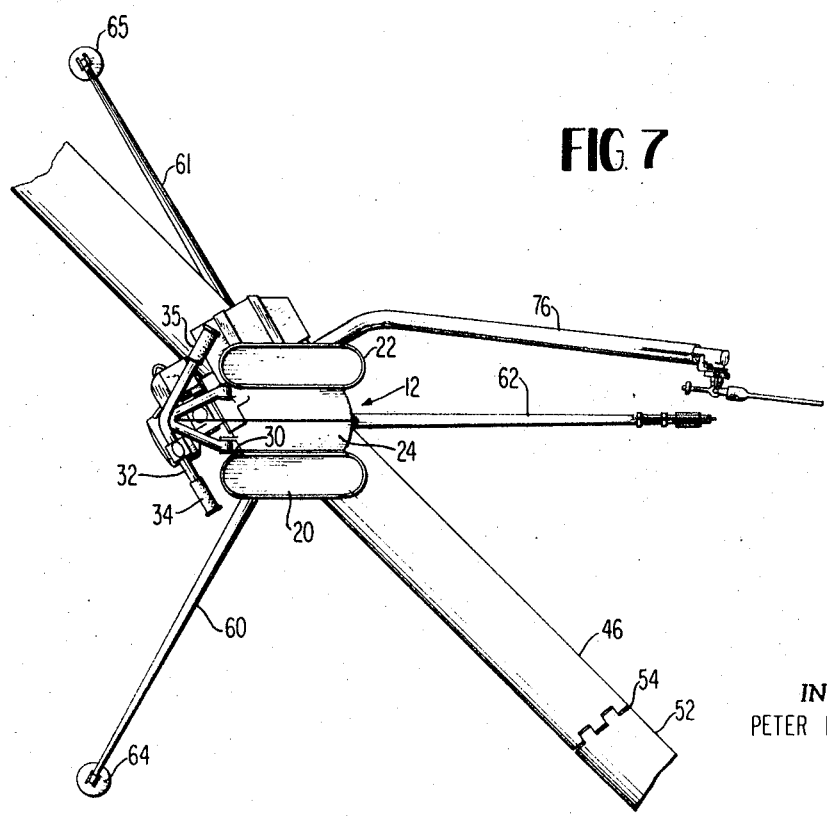
FIG. 7 is a top plan view of the kinesthetically controlled helicopter of FIG. 6.

The landing gear assembly 19 includes a landing gear support 56, see FIG. 10, extending downwardly from the platform through the drive shaft 44 and terminating in a fitting 58 which pivotally mounts a tripod landing gear of legs 60, 61 and 62. Pads 64 and 65 may be at the bottom of legs 60 and 61 and leg 62 ends in a curved end 66, see FIGS. 6 and 7. The curved end of leg 62 mounts a vertical fin 68. The legs are lightweight, tubular tapered members and with the weight of a man M on the helicopter they bend slightly as shown in FIG. 6.

The vertical fin 68 is secured to leg 62 by clamps 70 and 71, see FIG. 11, pivotably or removable claim 72 which pivots about axis 74 to unclamp the fin and allow the fin itself to pivot about the axis of leg 62 to its folded condition, see FIG. 8.

The tail rotor assembly 21 includes a tail boom 76 which is rotatable about its axis within a socket 78 in the platform 12 so that the tail boom itself may be folded as shown in FIGS. 8 and 9. A tail rotor 80 is driven from the motor 18 by a drive cable 82 extending through tubular boom 76. The drive is via drive shaft 84. The rotor blade 80 is attached to drive shaft 84 via pivot shaft 86 which mounts rotor hub 88 and a counter weight 90 extends oppositely the rotor 80. With this arrangement the rotor is free to flap.

Control of the tail rotor 80 to yaw the helicopter may be accomplished by controlling the pitch of the tail rotor via a control link 92, a pivoted lever 94 at 96 and connected via linkage 98 to the rotor blade 80.

In operation, a man or pilot standing on the platform 12 may start the motor rotating the rotor 16 and controlling the tail rotor 80 and fly the helicopter with substantially no previous experience. Controls are entirely within the handlebar assembly 14. On landing the helicopter, it may be folded to a compact arrangement shown in FIGS. 8 and 9 for manual portability. The helicopter folds by pivoting the outer ends 52 of rotor about hinge 54, pivoting the handlebar assembly 14 about pivot 28, rotating tail boom 76 in socket 78 and pivoting rotor 80 about pivot axis 86 and removing connecting pins 98 from fitting 58 to allow the legs to pivot about pivots 99 so that the helicopter assumes a compact condition, as shown in FIGS. 8 and 9, for easy manual portability.

While the invention has been particularly shown and described with reference to a preferred embodiment thereof, it will be understood by those skilled in the art that various changes in form and details may be made therein without departing from the spirit and scope of the invention. Although the foldability is preferable, it is not essential; for example when the cost of foldability outweighs the advantages obtained. The number of rotor blades is not necessarily restricted to two, but can be any number dictated by engineering convenience.

The operator could be provided with fairings which protect him from the weather and reduce the total drag of the vehicle. The rotor can have individually flapping blades, a teetering flapping hinge as illustrated or be of the cantilever type known as "semirigid." Any other known and suitable type of tail rotor could be utilized.

What I claim is:

1. A kinesthetically controlled one-man operated helicopter comprising a lightweight platform capable of supporting only a single-standing operator; means for permitting the operator to attach himself to the helicopter; directional control means being substantially provided only by the position of the man relative to the helicopter; a flapping rotor blade assembly consisting of a pair of rotor blades positioned 180° from each other; means hinge connecting the platform and the rotor blades to permit a flapping movement; a motor means for driving the rotor blades; landing gear means; and a tail rotor assembly means including a tail rotor and a tail boom extending rearwardly and operatively connected to the motor means to rotate the tail rotor.

2. A kinesthetically controlled helicopter as in claim 1 wherein the rotor blade assembly is located below the platform.

3. A kinesthetically controlled helicopter as in claim 2 wherein the tail boom is operatively connected to the motor on one side of the platform and extends upwardly from the flapping rotor blade assembly and rearwardly from an adjacent side of the platform 4. A kinesthetically controlled helicopter as in claim 1, wherein the rotor blade assembly is located above the platform and the standing operator.

5. A kinesthetically controlled helicopter as in claim 4 wherein the rotor blades are pivotable and foldable relative to the platform.

6. A kinesthetically controlled helicopter as in claim 5 wherein each blade includes a rigid and a flexible outboard portion, the pivot axis of each blade extending at an angle transverse to the longitudinal axis of the blade so that the outboard portion of the blade folds at an angle to the rigid portion of the blade.

7. A kinesthetically controlled helicopter as in claim 5 wherein the attaching means includes a foldable handle means and wherein the landing gear means, tail boom and tail rotor are foldable while remaining attached to the helicopter to provide easy portability.

8. A kinesthetically controlled helicopter as in claim 7 wherein the landing gear includes a plurality of legs, one of which carries a vertical fin, the legs being pivotable and foldable relative to the platform, and the vertical fin being pivotable and foldable relative to the leg which carries it.

9. A kinesthetically controlled helicopter as in claim 7 wherein the means connecting the platform and the rotor blades includes a spring drive connection.

10. A kinesthetically controlled helicopter as in claim 7 further including an instrument panel located adjacent the flapping rotor blade assembly above the standing operator.